Feb. 25, 1969 R. B. McCLOSKY 3,429,495
SEALED PACKAGES
Original Filed May 20, 1966
Sheet 2 of 4
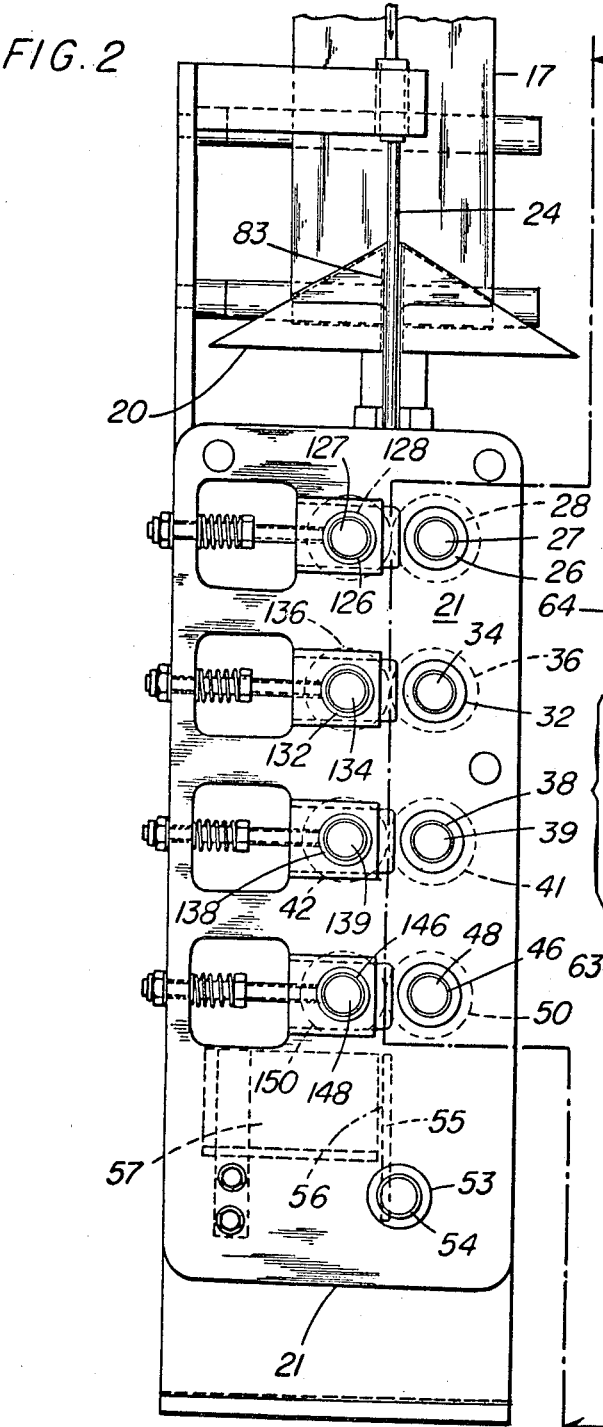
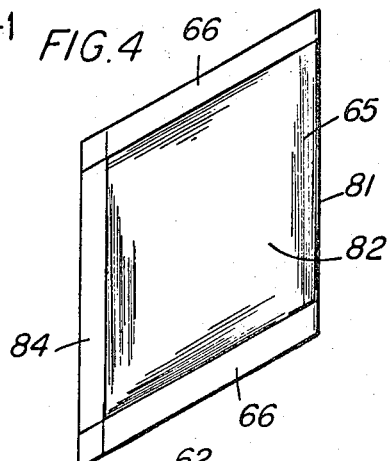
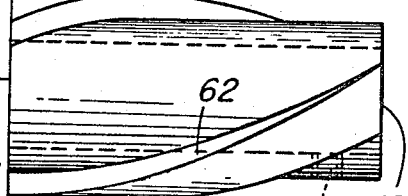
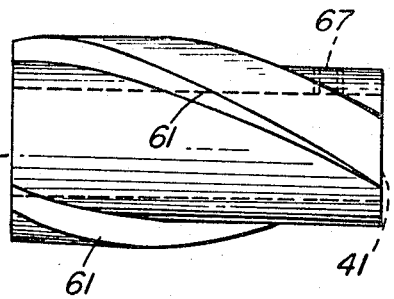
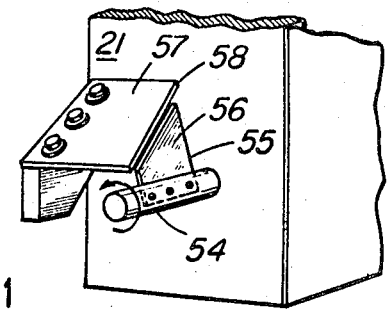

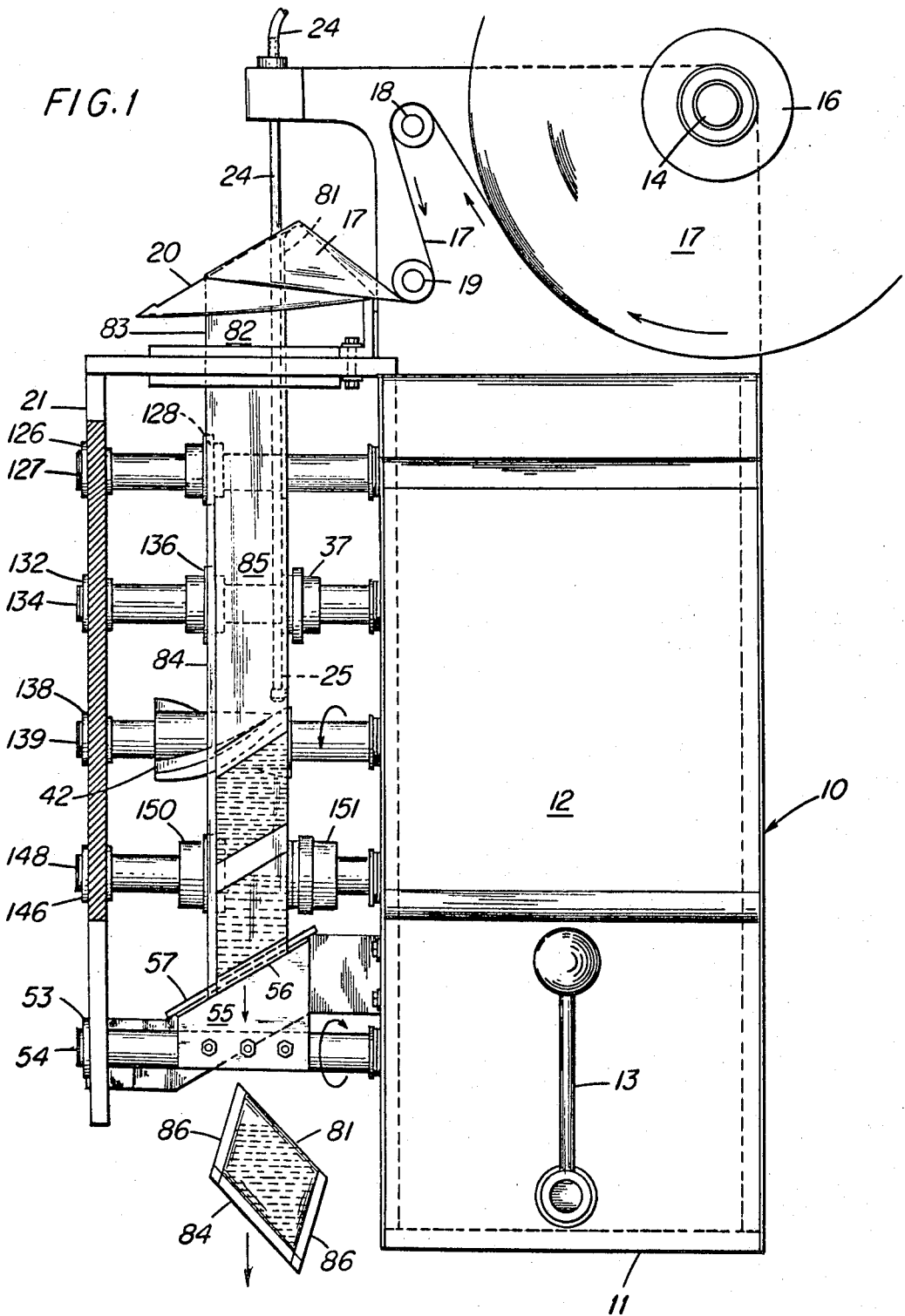

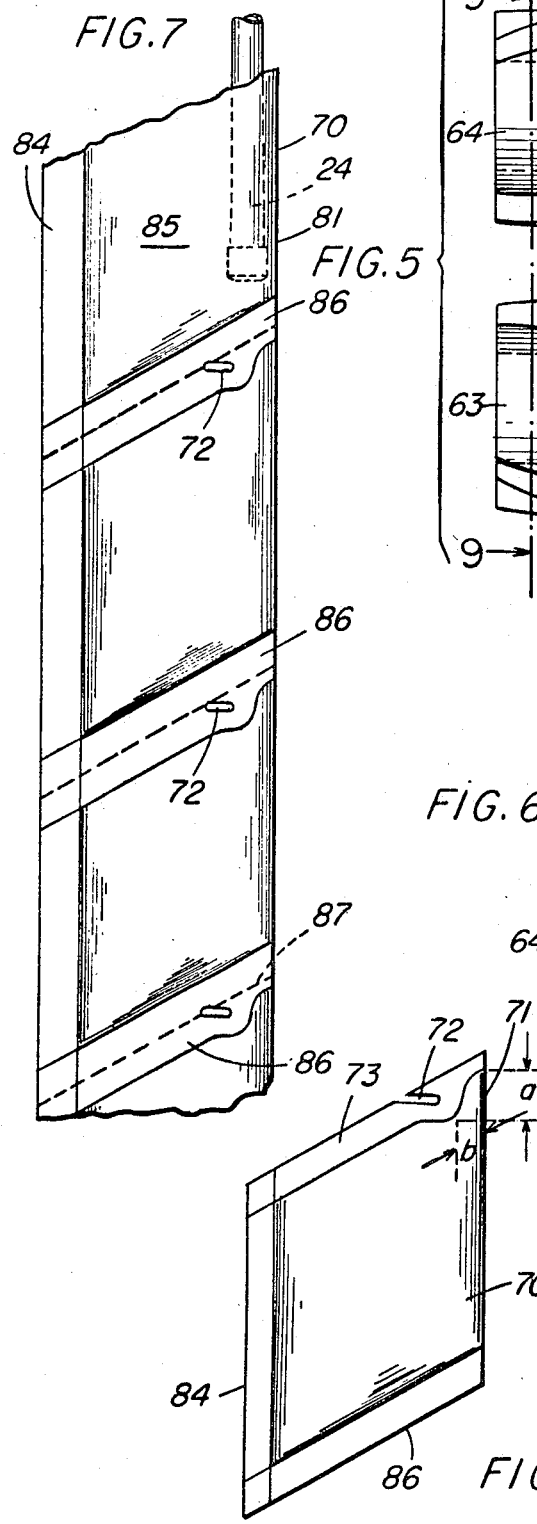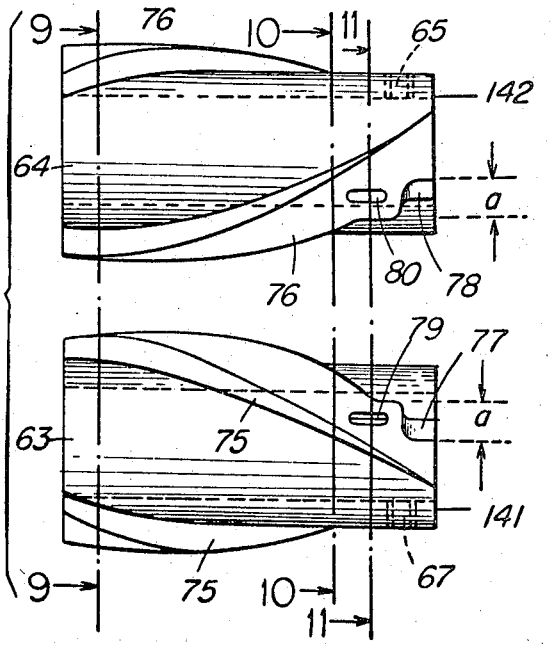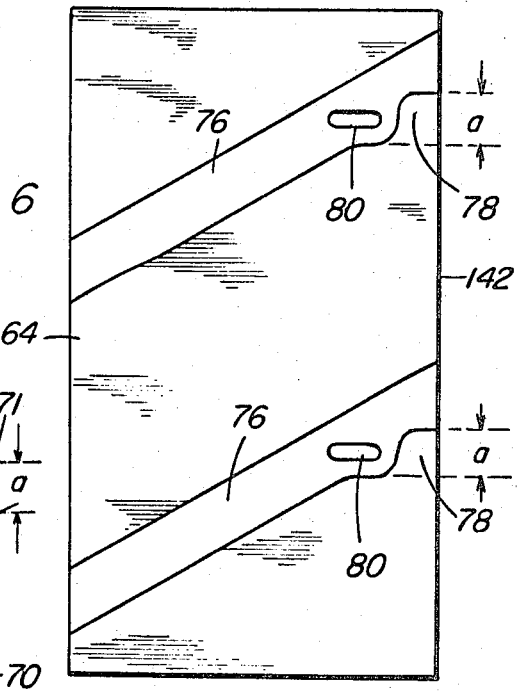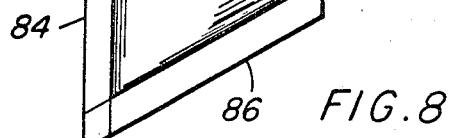

United States Patent Office 3,429,495
Patented Feb. 25, 1969

3,429,495
SEALED PACKAGES
Robert B. McClosky, 113 Lawn St.
Park Ridge, N.J. 07656
Original application May 20, 1966, Ser. No. 551,603, now Patent No. 3,378,988. Divided and this application Feb. 8, 1968, Ser. No. 703,943
U.S. Cl. 229—7                2 Claims
Int. Cl. B65d 5/00, 1/08, 3/00

ABSTRACT OF THE DISCLOSURE

The invention relates to sealed packages having a shape substantially in the form of a parallelogram and made of a single piece of flexible sheet material having a longitudinally folded edge and three heat sealed marginal edges. One of the heat sealed edges is substantially parallel to the longitudinally folded edge and the second heat sealed edge extends from the first heat sealed edge to the longitudinally folded edge and forms an acute angle with the first heat sealed edge and an obtuse angle with the longitudinally folded edge. The third heat sealed edge extends from the first heat sealed edge to the longitudinally folded edge and is substantially parallel to the second heat sealed edge. A pouring spout is between the longitudinally folded edge and the third heat sealed edge.

---

This application is a division of application Ser. No. 551,603, filed May 20, 1966, now Patent No. 3,378,988.

The present invention relates to sealed packages and methods and apparatus for making sealed packages, and more particularly, to sealed packages in which the transverse seals of the package are progressively formed from the longitudinal seal of the package to a folded edge of the package.

In previous machines for continuous forming of packages with transverse seals, the transverse seal was formed in a single stroke. In such prior packaging machines a web of sheet material was formed into a U-shape, the longitudinal edges sealed to form a tube, a transverse seal formed by a reciprocating heat healing means, the tube filled with the material which was to be packaged and the tube would progress through the packaging machine until the next transverse seal was formed in a single stroke. The filled tube would then progress to the cutting operation where the tube would be cut along the transverse sealed edge to form the desired package. In the previous packaging machines the entire transverse seam would be formed at the same time. Any wrinkles in the transverse edge which were present before sealing or which would originate when heat sealing would remain in the transverse seal after it was formed. After the cutting operation the wrinkles in the transverse seal would form cracks through which air might enter the package or the contents of the package leak out.

In the present invention the transverse seal is not formed at once, but is formed progressively from the side of the tube having the sealed edge to the side of the tube having the folded edge. This method of sealing has several important advantages. The wrinkles which would otherwise form in the transverse seal are in the present invention pushed along the path of the transverse seal as it is progressively being formed, thereby in effect rolling out any wrinkles as the seal is being made. When the transverse sealing means progresses as far as the longitudinal folded edge of the tube, the wrinkles disappear into the folded edge and the seal is completed. The transverse sealed edge is, therefore, substantially free from wrinkles and a fluid tight pouch is formed from which the contents will not leak.

When progressively forming the transverse seal in the present invention, only a small area of the transverse seal is under pressure at any instant. The thermoplastic sheet material of the package is sealed by a combination of temperature, pressure and time. Since the area being sealed at any instant is small the pressure on the area being sealed is high. The temperature of the sealing area, therefore, can be lower and the contact time of the sealer faster than if the entire seal is formed at once. The lower temperature of the area being sealed is desirable, particularly if the material being packaged should not be boiled.

An object of the present invention is, therefore, to form a package having a slant seal in which the transverse sealed edge is progressively formed from the longitudinally sealed edge to the longitudinally folded edge, thereby removing wrinkles from the lateral seal.

A further object of the present invention is to progressively form a transverse seal of a package to permit the seal to be formed at lower temperature and higher pressure than if the seal were formed at once.

An additional object of the present invention is to form a fluid tight package without wrinkles in the transverse seal and having a tear slit and spout for easy opening of the package by the consumer and easy pouring of the contents.

A further object of the present invention is to provide in a packaging tube a transverse slant seal which may be readily cut by cutting knives which progressively move across the transverse slant seal, thereby providing a shearing action for a rapid, clean cut.

Another object of the present invention is to provide a machine which can be operated at high speed for economical continuous mass production of a variety of packaged products.

A further object of the present invention is to provide in a single slant seal packaging machine means for accommodating sheet material of varying widths to permit producing slant sealed packages of various sizes.

For a fuller understanding of the nature and objects of the invention, reference should be had to the following detailed description taken in connection with the accompanying drawing in which:

FIG. 1 is a front elevational view with parts broken away of an embodiment of a package forming and filling machine of the present invention, taken substantially along line 1—1 of FIG. 2;

FIG. 2 is a side elevational view with parts broken away of the packaging machine of the FIG. 1 embodiment;

FIG. 3 is a detailed front elevational view of a pair of transverse sealers used in the FIG. 1 embodiment;

FIG. 4 is an enlarged view of a package formed by the packaging machine of the FIG. 1 embodiment;

FIG. 5 is a detailed front elevational view of another embodiment of the pair of transverse sealers of the FIG. 3 embodiment;

FIG. 6 is a layout pattern of the upper transverse sealer of the FIG. 5 embodiment;

FIG. 7 is an enlarged front elevational view of packages formed by employing the pair of transverse sealers of the FIG. 5 embodiment, and showing a portion of a filling tube;

FIG. 8 is an enlarged view of a package formed by employing the pair of transverse sealers of the FIG. 5 embodiment after the transverse cutting operation;

FIG. 12 is an enlarged prospective view with parts broken away of an embodiment of the package cutting means of the packaging machine illustrated in FIG. 1.

Figure 9:
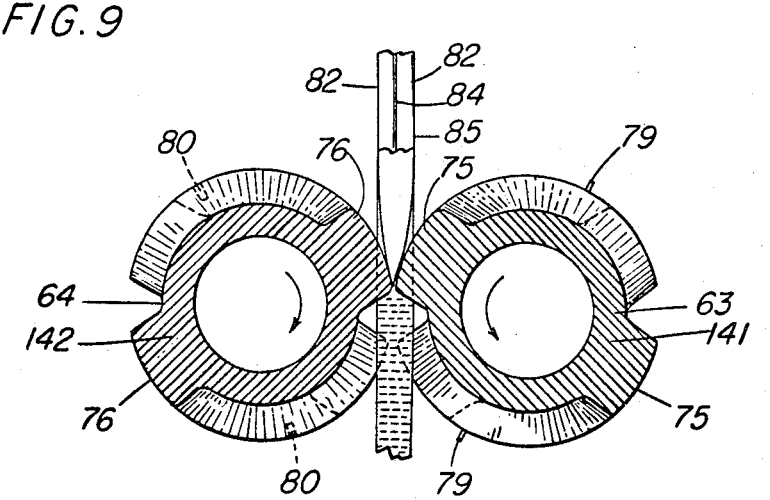
FIG. 9 is a detailed, axial section, taken substantially along line 9—9 of FIG. 5 of the pair of transverse sealers shown in FIG. 5 and showing the initial forming of a transverse seal.

Referring to the drawings, in which like numerals represent like parts throughout, one embodiment of the present invention, as shown in FIGS. 1 and 2, may include a packaging machine 10 having a base 11, motor and drive housing 12, operating switch 13 and roller support 14. Mounted on roller support 14 by mounting support means 16 is a roll of thin, flexible packaging material 17. Packaging material 17 may be of any desired heat sealable material, preferably a thermoplastic material, such as polyethylene or cellophane, although the present machine may also utilize pressure sensitive materials.

Idlers 18 and 19 are provided to feed the packaging material 17 into mandrel 20 which is mounted on support frame 21 which is attached to housing 12. Mandrel 20 is curved to form the packaging material 17 partially around filling tube 24. Filling tube 24 is provided to fill the packages to be formed with measured amounts of the desired contents and extends from a reservoir of material to be packaged (not shown) to inside the packages being formed. The lower end 25 of tube 24 may function as a guide or support for the packaging material 17.

Below mandrel 20 on support frame 21 there are rotatably mounted in bearings 26 and 126 drive shafts 27 and 127, respectively, in which are electrical heating elements. Longitudinal sealers 28 and 128 are movably mounted on drive shafts 27 and 127, respectively. The longitudinal sealers 28 and 128 which cooperate to form the longitudinal seal of the package to be formed may be positioned in opposed relationship on drive shafts 27 and 127, respectively, at any desired place to accommodate packaging material of varying widths. Longitudinal sealer 28 may, if desired, be of nickel plated steel. Longitudinal sealer 128 may have an aluminum hub with a silicone rubber sealing surface, or may be of the floating seal design of the type shown in the Natelli Patent No. 3,109,764, dated Nov. 5, 1963.

Located below longitudinal sealers 28 and 128 on support frame 21 are rotatably mounted in bearing 32 and 132 drive shafts 34 and 134, respectively. Movably mounted on drive shafts 34 and 134 in opposed relationship are pullers 36 and 136, respectively. A pair of guides 37 may if desired, be movable mounted on drive shafts 34 and 134 to guide the packaging material 17 through packaging machine 10.

Below drive shafts 34 and 134 on support frame 21 rotatably mounted in bearings 38 and 138 are drive shafts 39 and 139, respectively, in which are electrical heating elements. Movably mounted on drive shafts 39 and 139 are transverse sealers 41 and 42, respectively, which will be described in more detail below.

Located below transverse sealers 41 and 42 on support frame 21 in bearings 46 and 146 are drive shafts 48 and 148, respectively. Movably mounted on drive shafts 48 and 148 in opposed relationship are pullers 50 and 150, respectively. A pair of guides 51 may, if desired, be movably mounted on drive shafts 48 and 148 to guide the packaging material 17.

Below pullers 50 and 150 on support frame 21 in bearing 53 is drive shaft 54 on which is mounted knife 55 which has a cutting edge 56, as shown in detail in FIG. 12. Diagonally mounted on frame 21 is blade 57 which has a cutting edge 58 which cooperates with cutting edge 56 of knife 55.

Transverse sealers 41 and 42 are shown in detail in FIG. 3. In the FIG. 3 embodiment transverse sealers 41 and 42 have helically shaped sealing edges 61, 61 and 62, 62, respectively, which extend outwardly from the main hubs 63 and 64, respectively, of sealers 41 and 42. The sealing edges 61, 61 and 62, 62 are substantially heilcal which when operated in the present packaging machine provides a package with a diagonally slanted, straight, transverse seal. Variations in the shape of sealing edges 61, 61 and 62, 62 would permit packages to be formed in varying shapes. The sealing edges 61, 61 and 62, 62 must be in opposed relationship. The preferred embodiment, as shown in FIG. 3, therefore, shows a right and a left-handed helical sealing edges 61 and 62.

If the sealing edges 61 and 62 are in the form of right and left-handed helicals, as shown in FIG. 3, the package 65 formed will then have straight, diagonal, transverse seals 66, 66, as shown in FIG. 4. Threaded holes 67 and 68 are provided in hubs 63 and 64, respectively, for holding set screws which may be used for movably mounting transverse sealers 41 and 42 on drive shafts 39 and 139, respectively.

If it is desired to manufacture a package 70 as shown in FIGURE 8, having a pouring spout 71 and a tear slit 72 in transverse seal 73, this may be accomplished by certain variations in the shape of the sealing edges of the transverse sealers. As shown in FIG. 5, sealing edges 75 and 76 of transverse sealers 141 and 142 have opposed notches 77 and 78 at one end of the sealing edges which interrupts the helical sealing edges 75 and 76, respectively. A lay out drawing of transverse sealer 142 of the FIG. 5 embodiment is shown in FIG. 6. Notches 77 and 78 will form spout 71 in package 70, as shown in FIG. 8. The length $a$ of pouring spout 71, as shown in FIG. 8, will vary with the lengths $a$, $a$ of notches 77 and 78 in sealing edges 75 and 76, respectively. The width $b$ of pouring spout 71, as shown in FIG. 8 may be varied by varying the position of transverse sealers 141 and 142 on drive shafts 39 and 139, respectively. Variations in the size of the pouring spout may be desired to provide for suitable rates of discharge of packaged products of varying viscosities. For example, it might be desirable to have a wide spout for a package of ketchup and a small spout for a package of cream.

If desired, a tear slit 72, as shown in FIG. 8, may be provided for ease in opening the pouring spout 71. The tear slit is formed, as shown in FIG. 5, by a cutting edge 79, which extends outwardly from sealing edge 75. A mating die face 80 is provided in sealing edges 76 of transverse sealer 142.

As shown in FIG. 2, bearings 126, 132, 138, and 146 may, if desired, be movably mounted in support frame 21 to accommodate packaging material of varying widths and to provide for variations in the pressure exerted on the packaging material 17 by longitudinal sealers 28 and 128, pullers 36 and 136, transverse sealers 41 and 42, and pullers 50, 150, respectively.

A motor (not shown) in motor and drive housing 12 drive gears (not shown) which rotate drive shafts 27, 34, 39, 48, and 54 and counter rotate drive shafts 127, 134, 139 and 148.

In operating the packaging machine 10, a continuous roll of sheet packaging material 17 is mounted on roller support 14. One end of the packaging material 17 is fed through idlers 18 and 19 into mandrel 20 where the package material is formed by the mandrel and guided by the lower end 25 of filler tube 24. The packaging material 17 is thereby formed into a continuous folded strip of material having a folded edge 81, two opposed sides 82, 82 and an open edge 83, as shown in FIG. 1. The packaging material 17 moves downwardly through packaging machine 10 until the inside face to face, marginal portion of open edge 83 is heat sealed by rotating longitudinal sealers 28 and 128 to form longitudinal seal 84, thus forming a tube 85.

Figure 10:
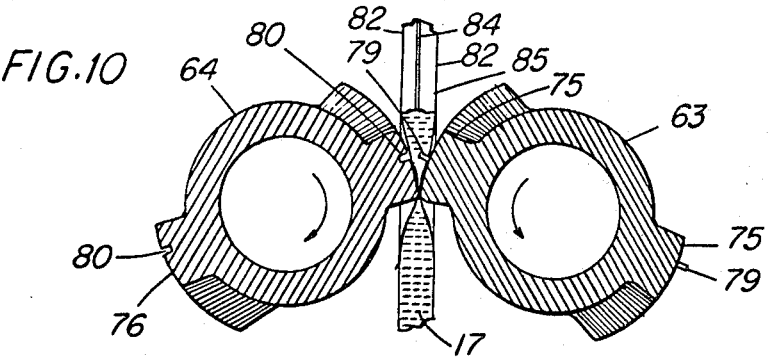
FIG. 10 is a detailed, axial section, taken substantially along line 10—10 of FIG. 5 of the pair of transverse sealers shown in FIG. 5 and showing the progressive forming of a transverse seal prior to cutting a tear slit.
Figure 11:
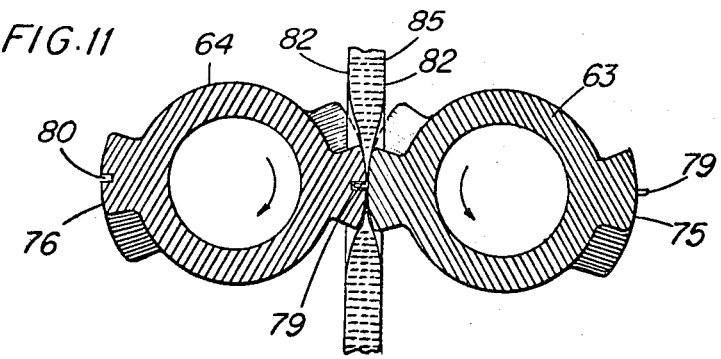
FIG. 11 is a detailed, axial section taken substantially along line 11—11 of FIG. 5 and showing the continued progressive forming of a transverse seal and the cutting of a tear strip slot.

As shown in series in FIGS. 9, 10 and 11, tube 85 proceeds downwardly to transverse sealers 141 and 142 of the FIG. 5 embodiment, where the diagonal transverse seal 86 is progressively formed. In FIG. 9 the helical sealing edges 75 and 76 of the transverse sealers 141 and 142, respectively, are just beginning to contact tube 85 at the longitudinal seal 84. The helical sealing edges 75 and 76 rotate in opposed relationship, as shown in FIGS. 9, 10, 11, as the packaging material 17 moves downwardly, to progressively form the diagonal transverse seal 86 from the longitudinal seal 84 to the folded edge 81 of the tube 85. Any wrinkles in the transverse seal are progressively pushed by helical sealing edges 75 and 76 to the folded edge 81 of tube 85 where they disappear into the folded edge. The tear slit 72 is sliced by cutting edges 79 cooperating with die 80, as shown in FIG. 10.

The package being formed is then filled by filler tube 24 with a measured quantity of the desired material to be packaged. The package being formed continues to move downwardly and the next diagonal lateral seal 86 is formed as described above. The filled package is continuously pulled downwardly by pullers 50 and 150, as shown in FIG. 1, to the cutter where knife 55 cooperating with cutting edge 56 cuts the package with a shearing action at the proper place 87 along lateral seal 86, as shown in FIG. 11.

As will be evident to those skilled in the art, various modifications of this invention can be made in light of the foregoing disclosure and discussion without departing from the spirit and scope of the present invention.

It is claimed:
1. A substantially fluid tight package having a shape substantially in the form of a parallelogram comprising:
    a single piece of flexible sheet material having a longitudinally folded edge and three heat sealed marginal edges;
    one of said heat sealed edges substantially parallel to said longitudinally folded edge;
    the second of said heat sealed edges extending from said first heat sealed edge to said longitudinally folded edge and forming an acute angle with said first heat sealed edge and an obtuse angle to said longitudinally folded edge;
    the third of said heat sealed edges extending from said first heat sealed edge to said longitudinally folded edge and being substantially parallel to said second heat sealed edge; and
    a pouring spout formed between said longitudinally folded edge and the third of said heat sealed edge.

2. A substantially fluid tight package of claim 1, in which a tear slit is provided in a portion of said third heat sealed edge to permit opening of said pouring spout.

References Cited

UNITED STATES PATENTS

| | | | |
|---|---|---|---|
| 2,923,404 | 2/1960 | Adell | 206—56 |
| 3,230,687 | 1/1966 | Nutting et al. | 53—180 |
| 3,387,701 | 6/1968 | Schneider et al. | 229—53 |

DAVID M. BOCKENEK, *Primary Examiner.*

U.S. Cl. X.R.

229—66; 206—56